(12) United States Patent
Okada et al.

(10) Patent No.: US 11,634,598 B2
(45) Date of Patent: Apr. 25, 2023

(54) INK JET COMPOSITION AND FLAMEPROOFING METHOD

(71) Applicant: Seiko Epson Corporation, Tokyo (JP)

(72) Inventors: Hideki Okada, Shiojiri (JP); Tasuku Nakamura, Matsumoto (JP)

(73) Assignee: SEIKO EPSON CORPORATION

( * ) Notice: Subject to any disclaimer, the term of this patent is extended or adjusted under 35 U.S.C. 154(b) by 836 days.

(21) Appl. No.: 16/580,281

(22) Filed: Sep. 24, 2019

(65) Prior Publication Data

US 2020/0095439 A1 Mar. 26, 2020

(30) Foreign Application Priority Data

Sep. 25, 2018 (JP) .............................. JP2018-179441

(51) Int. Cl.
| | |
|---|---|
| C09D 11/102 | (2014.01) |
| C08L 75/04 | (2006.01) |
| C08K 5/49 | (2006.01) |
| C09D 11/322 | (2014.01) |
| C08K 5/00 | (2006.01) |
| C08K 5/01 | (2006.01) |
| C08G 18/80 | (2006.01) |
| C08G 18/83 | (2006.01) |
| D06P 5/15 | (2006.01) |
| D06P 1/52 | (2006.01) |
| C08G 18/44 | (2006.01) |

(52) U.S. Cl.
CPC ............ *C09D 11/102* (2013.01); *C08G 18/44* (2013.01); *C08G 18/80* (2013.01); *C08G 18/837* (2013.01); *C08K 5/0066* (2013.01); *C08K 5/01* (2013.01); *C08K 5/49* (2013.01); *C08L 75/04* (2013.01); *C09D 11/322* (2013.01); *D06P 1/5285* (2013.01); *D06P 5/15* (2013.01); *C08L 2201/02* (2013.01); *C08L 2205/18* (2013.01)

(58) Field of Classification Search
CPC .. C09D 11/102; C09D 11/322; C09D 175/04; C09D 11/38; C08G 18/44; C08G 18/80; C08G 18/837; C08K 5/0066; C08K 5/01; C08K 5/49; C08L 75/04; C08L 2201/02; C08L 2205/18; D06P 1/5285; D06P 5/15; D06P 1/65156; D06P 1/0036; D06P 1/5257; D06P 1/54; D06P 1/65131; D06P 1/667; D06P 5/30; D06M 13/08; D06M 13/165; D06M 2200/30; D06M 13/292; D06M 15/564; D06M 23/00; D06M 23/08; D06M 23/16

See application file for complete search history.

(56) References Cited

U.S. PATENT DOCUMENTS

| | | | |
|---|---|---|---|
| 4,046,729 | A | 9/1977 | Scriven et al. |
| 4,290,988 | A | 9/1981 | Nopper et al. |
| 4,382,758 | A | 5/1983 | Nopper et al. |
| 6,051,645 | A | 4/2000 | Suzuki et al. |
| 6,770,331 | B1 | 8/2004 | Mielke et al. |
| 9,096,771 | B2 | 8/2015 | Okuda et al. |
| 9,321,921 | B2 | 4/2016 | Namba |
| 9,624,393 | B2 | 4/2017 | Ohta et al. |
| 2001/0043243 | A1* | 11/2001 | Tachihara ............ B41J 2/2125 347/65 |
| 2010/0091052 | A1 | 4/2010 | Ogawa et al. |
| 2013/0201252 | A1 | 8/2013 | Namba |
| 2015/0204015 | A1 | 7/2015 | Gomi et al. |
| 2016/0193754 | A1 | 7/2016 | Gomi et al. |
| 2017/0121543 | A1 | 5/2017 | Sakaguchi et al. |
| 2017/0203478 | A1 | 7/2017 | Gomi et al. |
| 2018/0072073 | A1 | 3/2018 | Makuta |
| 2018/0244935 | A1 | 8/2018 | Sakaguchi et al. |
| 2018/0257104 | A1 | 9/2018 | Che et al. |

FOREIGN PATENT DOCUMENTS

| | | | |
|---|---|---|---|
| EP | 3382093 | A1 | 10/2018 |
| JP | S55-090659 | A | 7/1980 |
| JP | H03-076885 | A | 4/1991 |
| JP | H08-157758 | * | 6/1996 |
| JP | 2009-030014 | A | 2/2009 |
| JP | 2010-106377 | A | 5/2010 |
| JP | 2013-176972 | A | 9/2013 |
| JP | 2016-186146 | A | 10/2016 |
| JP | 2017-043681 | A | 3/2017 |
| JP | 2017-155110 | A | 9/2017 |
| WO | 2017-098920 | A1 | 6/2017 |

OTHER PUBLICATIONS

Machine translation of JPH08-157758 1996.*
Extended European Search Report for Application No. EP 19 16 3291 dated Jul. 22, 2019 (7 pages).

* cited by examiner

*Primary Examiner* — Irina S Zemel
(74) *Attorney, Agent, or Firm* — Harness, Dickey & Pierce, P.L.C.

(57) ABSTRACT

An ink jet composition according to the present disclosure contains a flameproofing agent and resin particles. The resin particles are preferably urethanic resin particles. It is preferable that a urethanic resin making up the urethanic resin particles is a urethanic resin containing a crosslinking group and the crosslinking group is one or more selected from the group consisting of a blocked isocyanate group and a silanol group. The urethanic resin making up the urethanic resin particles preferably has a polycarbonate skeleton.

10 Claims, No Drawings

INK JET COMPOSITION AND FLAMEPROOFING METHOD

The present application is based on, and claims priority from, JP Application Serial Number 2018-179441, filed Sep. 25, 2018, the disclosure of which is hereby incorporated by reference herein in its entirety.

BACKGROUND

1. Technical Field

The present disclosure relates to an ink jet composition and a flameproofing method.

2. Related Art

An ink jet dyeing method using an ink jet process is known as a method for dyeing fabric.

On the other hand, for example, interior products for places, such as schools, department stores, theaters, and hospitals, crowded with people are obligated to be flameproof.

Fabric is usually rendered flameproof in such a manner that the fabric, which is a treated object, is immersed in a liquid composition containing a flame retardant (see, for example, JP-A-2010-106377).

However, in the above manner, there is a problem in that steps are complicated because of offline treatment, the productivity of flameproofed fabric is low, and a large amount of liquid waste is caused.

SUMMARY

The present disclosure has been made to solve the above problem and can be embodied in the form of applications below.

(1) An ink jet composition contains a flameproofing agent and resin particles.

(2) In the ink jet composition specified in (1), the resin particles is urethanic resin particles.

(3) In the ink jet composition specified in (2), a urethanic resin making up the urethanic resin particles is a urethanic resin containing a crosslinking group and the crosslinking group is one or more selected from the group consisting of a blocked isocyanate group and a silanol group.

(4) In the ink jet composition specified in (2) or (3), the urethanic resin making up the urethanic resin particles has a polycarbonate skeleton.

(5) In the ink jet composition specified in any one of (1) to (4), the flameproofing agent includes at least one selected from the group consisting of a bromine-based flameproofing agent, a phosphorus-based flameproofing agent, and a chlorine-based flameproofing agent.

(6) The ink jet composition specified in any one of (1) to (5) further contains a lubricant with a melting point of 200° C. or less.

(7) The ink jet composition specified in any one of (1) to (6) further contains a colorant and the content of the colorant is 0.1% by mass or less.

(8) In the ink jet composition specified in any one of (1) to (7), a dry film of the ink jet composition has a Young's modulus of 5 MPa to 70 MPa.

(9) A flameproofing method includes a discharge step of discharging the ink jet composition specified in any one of (1) to (8) by an ink jet process to apply the ink jet composition to a treated object.

(10) In the flameproofing method specified in (9), in the discharge step, the ink jet composition is discharged under such conditions that the discharge velocity thereof is 5.0 m/s to 10 m/s and the shortest distance between an opening of a nozzle plate and a surface of the treated object is 0.5 mm to 5.0 mm.

(11) In the flameproofing method specified in (9) or (10), in the discharge step, the ink jet composition is applied to the treated object with a droplet weight of 15 ng or less at a rate of 15 mg/inch$^2$ or more.

DESCRIPTION OF EXEMPLARY EMBODIMENTS

Preferred embodiments of the present disclosure will now be described in detail.

Ink Jet Composition

First, an ink jet composition according to an embodiment of the present disclosure is described.

The ink jet composition contains a flameproofing agent and resin particles.

According to such a configuration, a film made of a material containing the flameproofing agent can be formed on a surface of a treated object to which the ink jet composition is applied, whereby a flameproofing effect can be obtained. The film contains a resin material, is therefore unlikely to fall from the treated object, and is excellent in durability such as rubfastness. In order to exhibit the flameproofing effect, it is important that the film is placed on the treated object surface. Even when the film is relatively thin, the flameproofing effect can be sufficiently exhibit. Thus, it is not necessary that the thickness of the film is unnecessarily large or an unnecessarily deep portion of the treated object contains the flameproofing agent. Therefore, the reduction in handleability of a flameproof product manufactured using the ink jet composition because of the reduction in flexibility thereof and/or the reduction in texture or feel due to stiffness or the like can be effectively prevented. The usage of the flameproofing agent or a composition containing the flameproofing agent can be suppressed, which is preferable from the viewpoint of cost reduction and resource saving. In particular, a method in which treated objects are immersed in a liquid composition containing a flame retardant as conventionally performed has a problem that a large amount of liquid waste is caused. In the present disclosure, sufficient flameproof properties can be obtained by applying a relatively small amount of the ink jet composition to a desired portion of the treated object; hence, the occurrence of the above problem can be effectively prevented. The ink jet composition is discharged by an ink jet process, enables online treatment, and therefore is advantageous in increasing the productivity of the flameproof product, which is the flameproofed treated object. The ink jet composition contains a resin material in the form of particles. Therefore, the increase in viscosity of the ink jet composition is effectively prevented and the ink jet composition is excellent in discharge stability by the ink jet process. Various treated objects can be flameproofed well in such a manner that the amount of a droplet of the ink jet composition or the amount of the ink jet composition applied to each treated object per unit area is adjusted depending on the material quality, surface roughness, or the like of the treated object. When the treated object is fabric, there has been a problem in that local shrinkage occurs to reduce the flatness of the flameproof product. However, in the present disclosure, the occurrence of such a problem can be effectively prevented.

However, when the above condition is not satisfied, satisfactory results are not obtained. In a case where, for example, resin in a liquid state such as a molten state or a dissolved state is used instead of the resin particles, when a sufficient amount of the resin to obtain a sufficient flameproofing effect or durability is contained in the ink jet composition, the ink jet composition has significantly increased viscosity; hence, the discharge stability of the ink jet composition is significantly low or the ink jet composition cannot be discharged by the ink jet process. Alternatively, when the resin material is not contained in the ink jet composition, the adhesion of the flameproofing agent to the treated object is low and the flameproofness or durability of the flameproof product, which is manufactured using the ink jet composition, cannot be sufficiently enhanced.

Flameproofing Agent

The ink jet composition contains the flameproofing agent.

The flameproofing agent itself exhibits flame retardancy and has the function of imparting flameproof properties to the treated object, to which the ink jet composition is applied.

The flameproofing agent may be one having the above function. Examples of the flameproofing agent include bromine-based flameproofing agents that are compounds containing a bromine atom, phosphorus-based flameproofing agents that are compounds containing a phosphorus atom, chlorine-based flameproofing agents that are compounds containing a chlorine atom, metal hydroxide-based flameproofing agents that are compounds containing a metal hydroxide, antimony-based flameproofing agents that are compounds containing an antimony atom, ammonium carbonate, zinc borate, zinc tin oxide, molybdenum compounds, melamine cyanurate, triazine compounds, guanidine compounds, silicon polymers, reactive vinyl group-containing flame retardants, epoxy group-containing flame retardants, and carboxylic acid-containing flame retardants. These may be used alone or in combination. The flameproofing agent preferably includes at least one selected from the group consisting of the bromine-based flameproofing agents, the phosphorus-based flameproofing agents, and the chlorine-based flameproofing agents.

This enables particularly excellent flameproof properties to be imparted to the treated object provided with the ink jet composition. These flameproofing agents are highly transparent and are unlikely to negatively affect the color of the treated object.

Examples of the bromine-based flameproofing agents include pentabromodiphenyl ether, octabromodiphenyl ether, decabromodiphenyl ether, tetrabromobisphenol A, hexabromocyclododecane, and hexabromobenzene. In particular, decabromodiphenyl ether is preferable.

Examples of the phosphorus-based flameproofing agents include aromatic phosphates such as triphenyl phosphate, red phosphorus, halogen-containing phosphates, derivatives of the halogen-containing phosphates, and dimethyl methyl phosphonate oligomers. In particular, triphenyl phosphate is preferable.

Examples of the chlorine-based flameproofing agents include chlorinated paraffin and polychlorobiphenyl. In particular, chlorinated paraffin is preferable.

The flameproofing agent may be contained in the ink jet composition in any form and is preferably contained in the form of particles.

This enables the viscosity of the ink jet composition to be maintained good and also enables excellent flameproof properties to be obtained in the flameproof product, which is manufactured using the ink jet composition.

When the flameproofing agent is particulate, the lower limit of the average particle size thereof is preferably 0.01 µm, more preferably 0.02 µm, and further more preferably 0.03 µm. The upper limit of the average particle size of the flameproofing agent is preferably 1 µm, more preferably 0.5 µm, and further more preferably 0.4 µm. This allows the above-mentioned effects to be more remarkably exhibited.

The term "average particle size" as used herein refers to the particle size at a cumulative volume percentage of 50% by volume in a case where the volumes of particles are summed up in increasing order of size in a particle size distribution obtained by a dynamic light scattering method. The particle size distribution can be determined by measurement using a nano-particle size distribution analyzer (for example, Nanotrac UPA-EX150, manufactured by Nikkiso Co., Ltd.).

The lower limit of the content of the flameproofing agent in the ink jet composition is preferably 3.0% by mass, more preferably 5.0% by mass, and further more preferably 10% by mass. The upper limit of the content of the flameproofing agent in the ink jet composition is preferably 30% by mass, more preferably 25% by mass, and further more preferably 20% by mass.

This enables particularly excellent flameproof properties to be imparted to the treated object provided with the ink jet composition.

Resin Particles

The ink jet composition contains the resin particles. The resin particles have the function of bringing the flameproofing agent into close contact with the treated object after the ink jet composition is applied to the treated object.

In the flameproof product, which is manufactured using the ink jet composition, the resin particles usually form a film in which at least one portion of each resin particle is melted and a plurality of the resin particles are fused together.

Even in a case where the resin material, which is contained in the ink jet composition, is not particulate but is in, for example, a liquid state such as a molten state or a dissolved state, the resin material enables the flameproofing agent to be attached to the treated object. In this case, the ink jet composition has increased viscosity; hence, the discharge stability of the ink jet composition is significantly low and the ink jet composition cannot be discharged by the ink jet process in some cases. However, since the ink jet composition contains the resin particles, which are particulate resin materials, the occurrence of the above problem can be effectively prevented.

The resin material, which makes up the resin particles, is, for example, a urethanic resin, an acrylic resin, a vinylic resin such as a vinyl acetate-ethylene resin, or the like and is preferably the urethanic resin. In other words, the resin particles are preferably urethanic resin particles.

This enables the fixation of the flameproofing agent to the treated object to be enhanced, thereby enabling the durability of the flameproof product, particularly the rubfastness thereof, to be enhanced.

Incidentally, the urethanic resin may be one containing a urethane bond in a molecule thereof and is particularly preferably one containing a urethane bond in a main chain thereof. The acrylic resin is resin containing (meth)acrylic acid or an ester thereof as at least one of constituent monomers.

The urethanic resin, which makes up the urethanic resin particles, may be one having a urethane structure as a repeating structure and may be one containing no crosslinking group. The urethanic resin preferably contains a crosslinking group.

This enables the retentivity of the flameproofing agent in the flameproof product to be enhanced, thereby enabling the durability of the flameproof product, particularly the rubfastness thereof, to be enhanced.

The crosslinking group, which is contained in the urethanic resin, is, for example, a blocked isocyanate group, a silanol group, an aziridinyl group, a carbodiimide group, an oxazoline group, an amide group, a hydrazide group, or the like and is preferably one or more selected from the group consisting of the blocked isocyanate group and the silanol group.

This enables the rubfastness of the flameproof product, particularly the fastness to wet rubbing during water washing or the like and the fastness to dry rubbing during dry cleaning or the like, to be enhanced.

Examples of the urethanic resin, which makes up the urethanic resin particles, include those having a polycarbonate skeleton, those having an ester skeleton, and those having an ether skeleton. The urethanic resin is preferably one having a polycarbonate skeleton.

This enables the rubfastness of the flameproof product, particularly the fastness to wet rubbing during water washing or the like and the fastness to dry rubbing during dry cleaning or the like, to be enhanced.

The lower limit of the average size of the resin particles is, but is not limited to, preferably 0.01 μm, more preferably 0.02 μm, and further more preferably 0.03 μm. The upper limit of the average size of the resin particles is, but is not particularly limited to, preferably 1 μm, more preferably 0.5 μm, and further more preferably 0.4 μm.

This enables the extreme increase in thickness of a film formed on the treated object from the ink jet composition to be more effectively prevented and also enables the adhesion of the formed film to the treated object to be enhanced.

The lower limit of the content of the resin particles in the ink jet composition is, but is not particularly limited to, preferably 2.0% by mass, more preferably 5.0% by mass, and further more preferably 8.0% by mass. The upper limit of the content of the resin particles in the ink jet composition is, but is not particularly limited to, preferably 35% by mass, more preferably 30% by mass, and further more preferably 25% by mass.

This enables the extreme reduction in amount of the flameproofing agent applied to the treated object to be effectively prevented and also enables the adhesion of the flameproofing agent to the treated object to be rendered more excellent. As a result, flameproof properties of the flameproof product and the durability thereof can be rendered more excellent.

Supposing that the content of the resin particles in the ink jet composition is XR (mass percent) and the content of the flameproofing agent in the ink jet composition is XF (mass percent), the lower limit of XF/XR is preferably 0.1, more preferably 0.3, further more preferably 0.7, and most preferably 1.0. The upper limit of XF/XR is preferably 2.0, more preferably 1.7, and further more preferably 1.5.

This enables the extreme reduction in amount of the flameproofing agent applied to the treated object to be effectively prevented and also enables the adhesion of the flameproofing agent to the treated object to be rendered more excellent. As a result, flameproof properties of the flameproof product and the durability thereof can be rendered more excellent.

Liquid Medium

The ink jet composition usually contains a liquid medium functioning as a dispersion medium for dispersing the resin particles.

Since the ink jet composition contains the liquid medium, the ink jet composition can be discharged well by the ink jet process.

The liquid medium may be, for example, one having a function as a dispersion medium for a component other than the resin particles and a function as a solvent for a component other than the resin particles in addition to the above function.

The liquid medium used is usually one that is liquid at room temperature (for example, 25° C.).

In particular, the liquid medium is preferably one containing water.

This enables the damage to the treated object provided with the ink jet composition to be more effectively suppressed. Furthermore, this is preferable from the viewpoint of suppressing a problem with volatile organic compounds (VOCs).

The percentage of water in the liquid medium, which is contained in the ink jet composition, is preferably 40% by mass or more, more preferably 50% by mass or more, and further more preferably 60% by mass or more.

This enables the above-mentioned effect to be more remarkably exhibited.

The upper limit of the percentage of water in the liquid medium, which is contained in the ink jet composition, is 100% by mass.

The liquid medium used may be, for example, a hydrophilic solvent such as glycerin, triethylene glycol, propylene glycol, or triethylene glycol monobutyl ether.

This enables, for example, the moisture retentivity of the ink jet composition to be enhanced, thereby enabling the unintentional precipitation of solid matter in the ink jet composition by drying in an ink jet head or the like to be more effectively prevented. Furthermore, the viscosity of the ink jet composition can be adjusted well. These enable the discharge stability of the ink jet composition by the ink jet process to be rendered more excellent.

In particular, the hydrophilic solvent is preferably used in combination with water.

This enables the moisture retentivity of the ink jet composition to be rendered better. Furthermore, the moisture retentivity of the ink jet composition can be adjusted well.

The lower limit of the content of the liquid medium in the ink jet composition is, but is not particularly limited to, preferably 40% by mass, more preferably 50% by mass, and further more preferably 62% by mass. The upper limit of the content of the liquid medium in the ink jet composition is, but is not particularly limited to, preferably 93% by mass, more preferably 90% by mass, and further more preferably 85% by mass.

This allows the content of the flameproofing agent, the resin particles, or the like in the ink jet composition to be relatively high and enables the discharge stability of the ink jet composition to be rendered more excellent. As a result, the flameproof product can be more efficiently manufactured.

Lubricant (Wax)

The ink jet composition may contain, for example, a lubricant.

This enables the flameproof product, which is manufactured using the ink jet composition, to be more effectively prevented from becoming stiff, thereby enabling the texture or feel of the flameproof product to be rendered more excellent. In particular, when the treated object is a fibrous substrate such as fabric, such an effect is remarkably exhibited.

The melting point of the lubricant is, but is not particularly limited to, preferably 200° C. or less, more preferably 180° C. or less, and further more preferably 170° C. or less. The lower limit of the melting point of the lubricant is, but is not particularly limited to, preferably 50° C. and more preferably 60° C.

This allows the above-mentioned effect of the lubricant to be more remarkably exhibited under usual conditions (under, for example, a −20° C. to 50° C. environment) for the flameproof product.

The lubricant, which is contained in the ink jet composition, may be a compound which contains a hydrophilic moiety and a hydrophobic moiety and which has a particulate form. Examples of the lubricant include polypropylene wax, polyethylene wax, amide wax, and modifications thereof.

In the ink jet composition, when the lubricant is particulate, the lower limit of the average particle size thereof is, but is not particularly limited to, preferably 0.01 μm, more preferably 0.02 μm, and further more preferably 0.03 μm. The upper limit of the average particle size of the lubricant is, but is not particularly limited to, preferably 0.5 μm, more preferably 0.7 μm, and further more preferably 1.0 μm.

This allows the above-mentioned effect of the lubricant to be more remarkably exhibited. In particular, when the treated object is fabric, the lubricant is likely to enter gaps between fibers and is likely to be reliably held. Therefore, the friction between the fibers is reduced and the fibers slide more smoothly. As a result, the texture or feel of the flameproof product can be rendered more excellent.

The lower limit of the content of the lubricant in the ink jet composition is, but is not particularly limited to, preferably 0.5% by mass, more preferably 1.0% by mass, and further more preferably 1.5% by mass. The upper limit of the content of the lubricant in the ink jet composition is, but is not particularly limited to, preferably 10% by mass, more preferably 7.0% by mass, and further more preferably 5.0% by mass.

This allows flameproof properties of the flameproof product and the durability thereof to be excellent and enables the texture or feel of the flameproof product to be rendered more excellent.

Supposing that the content of the resin particles in the ink jet composition is XR (mass percent) and the content of the lubricant in the ink jet composition is XW (mass percent), the lower limit of XW/XR is preferably 0.05, more preferably 0.10, and further more preferably 0.15. The upper limit of XW/XR is preferably 0.70, more preferably 0.60, and further more preferably 0.50.

This allows flameproof properties of the flameproof product to be sufficiently excellent and enables the texture or feel of the flameproof product to be rendered more excellent.

Crosslinking Agent

The ink jet composition may contain a crosslinking agent.

This enables a crosslinking reaction to proceed well on the treated object provided with the ink jet composition when, for example, the resin material, which makes up the resin particles, or the like contains a crosslinking group, thereby enabling the adhesion between the treated object and the flameproofing agent and the durability of the flameproof product, which is manufactured using the ink jet composition, to be rendered more excellent.

When the ink jet composition contains the crosslinking agent, the lower limit of the content of the crosslinking agent in the ink jet composition is preferably 1.0% by mass, more preferably 2.0% by mass, and further more preferably 3.0% by mass. The upper limit of the content of the crosslinking agent in the ink jet composition is preferably 10% by mass, more preferably 8.0% by mass, and further more preferably 7.0% by mass.

This allows the content of the crosslinking agent, the resin particles, or the like to be relatively high, enables the crosslinking reaction to proceed efficiently in the manufacture of the flameproof product, allows the flameproofness and durability of the flameproof product to be more excellent, and enables the productivity of the flameproof product to be increased.

Another Component

The ink jet composition may contain an component (another component) other than the above-mentioned components.

Examples of the other component include polymerization initiators, polymerization initiators, various dispersants, surfactants, colorants, penetrants, pH adjustors, chelating agents such as ethylenediaminetetraacetic acid (EDTA), antiseptic/antimildew agents, rust preventives, oxidation inhibitors, ultraviolet absorbers, oxygen absorbers, dissolution aids, ureas, and alkaline substances including organic alkalis such as triethanolamine and inorganic alkalis such as sodium hydroxide. The antiseptic/antimildew agents used may be, for example, compounds having an isothiazoline ring structure in a molecule thereof.

The surfactants used may be, for example, various surfactants such as anionic surfactants, cationic surfactants, and nonionic surfactants.

In particular, examples of a surfactant contained in the ink jet composition include acetylenic surfactants, silicone surfactants, and fluorinated surfactants.

When the ink jet composition contains a silicone surfactant, the wettability of the ink jet composition to the treated object can be rendered better.

When the ink jet composition contains an alkaline substance, the dispersion stability of the resin particles in the ink jet composition, particularly the dispersion stability of the urethanic resin particles made of the urethanic resin, can be rendered more excellent.

The content of the other component in the ink jet composition (when the other component is one of a plurality of types of components contained therein, the sum of the contents of the components) is preferably 6% by mass or less and more preferably 5% by mass or less.

The lower limit of the content of the other component therein is 0% by mass.

The ink jet composition can be used in, for example, applications, such as clear inks, containing no colorant and may contain a colorant.

The type, composition, color tone, or the like of the colorant, which is contained in the ink jet composition, is not particularly limited. The colorant used may be any of various pigments and various dyes. Examples of the color tone of the colorant include cyan, magenta, yellow, and black. The ink jet composition may contain two or more types of colorants.

When the ink jet composition contains the colorant, the content of the colorant therein is preferably 0.1% by mass or less, more preferably 0.05% by mass or less, and further more preferably 0.01% by mass or less.

This enables, for example, a dyed treated object such as a print to be used well as an overcoat material unlikely to adversely affect the color tone of the treated object.

The lower limit of the content of the colorant in the ink jet composition is 0% by mass and may be 0.001% by mass.

The ink jet composition contains the resin particles in a solid state as described above and may further contains the resin material in a liquid state such as a dissolved state or a molten state. Even in this case, the percentage of the resin material in a liquid state in the whole resin material contained in the ink jet composition is preferably low. In particular, the percentage of the resin material in a liquid state in the whole resin material contained in the ink jet composition is preferably 10% by mass or less, more preferably 5% by mass or less, and further more preferably 1% by mass or less. Incidentally, the lower limit of the percentage of the resin material in a liquid state in the whole resin material contained in the ink jet composition is 0% by mass.

The lower limit of the surface tension of the ink jet composition at 25° C. is preferably 20 mN/m, more preferably 21 mN/m, and further more preferably 23 mN/m. The upper limit of the surface tension of the ink jet composition at 25° C. is preferably 50 mN/m, more preferably 40 mN/m, and further more preferably 30 mN/m.

This allows an nozzle of an ink jet head to be more unlikely to clog, thereby enhancing the discharge stability of the ink jet composition. Even if the nozzle clogs, recovery by capping the nozzle (capping) can be rendered more excellent.

The surface tension used may be a value determined by the Wilhelmy method. A surface tensiometer (for example, CBVP-7 or the like, manufactured by Kyowa Interface Science Co., Ltd.) can be used to measure the surface tension.

The lower limit of the viscosity of the ink jet composition at 25° C. is preferably 2 mPa·s, more preferably 3 mPa·s, and further more preferably 4 mPa·s. The upper limit of the viscosity of the ink jet composition at 25° C. is preferably 10 mPa·s, more preferably 8 mPa·s, and further more preferably 6 mPa·s.

This allows the discharge stability of the ink jet composition by the ink jet process to be more excellent.

Incidentally, the viscosity of the ink jet composition can be determined by measurement in accordance with JIS Z 8809 using a vibratory viscometer.

The ink jet composition preferably satisfies conditions below. The lower limit of the Young's modulus of a dry film of the ink jet composition is preferably 5 MPa, more preferably 15 MPa, and further more preferably 18 MPa, the dry film being obtained in such a manner that a film is formed from the ink jet composition by a method below and is dried. The upper limit of the Young's modulus of the dry film of the ink jet composition is preferably 70 MPa, more preferably 60 MPa, and further more preferably 40 MPa.

This enables the fixation of the flameproofing agent to the treated object to be enhanced, thereby enabling the durability of the flameproof product, particularly the rubfastness thereof, to be enhanced.

A dry film for Young's modulus measurement can be manufactured as described below. That is, a frame, made of silicone rubber (a thickness of 5 mm), having an opening portion with a size of 3 cm×19 cm is brought into close contact with a flat plate made of stainless steel (SUS) and 10 g of the ink jet composition is put in the opening portion and is dried at 25° C. for 12 hours in air. After the dried ink jet composition is heat-treated at 160° C. for 15 minutes and is returned to 25° C., no change in weight is confirmed and a dried film is peeled from the flat plate made of SUS, whereby the dry film for Young's modulus measurement can be obtained.

The thickness of the dry film obtained as described above can be determined by measurement with a micrometer (for example, the trade name "MDH-25M", manufactured by Mitutoyo Corporation).

The Young's modulus can be measured as described below. That is, a specimen having a width of 10 mm and a length of 30 mm is cut out of the vicinity of the center of the film obtained as described above. A stress-strain curve is measured for the specimen at a strain rate of 100 mm/min using a TENSILON universal testing machine (the trade name RTG-1250, manufactured by A&D Company, Limited. The Young's modulus (MPa) is determined by linear regression between a strain of 0.05% and a strain of 0.25% in the obtained stress-strain curve.

The ink jet composition may be directly discharged by the ink jet process. After, for example, another component such as a dilution solvent is added to the ink jet composition, the ink jet composition may be discharged by the ink jet process. Two or more types of ink jet compositions are mixed together and may be then discharged by the ink jet process. In other words, the ink jet composition may be an ink jet ink itself or an ink precursor such as an undiluted solution of the ink jet ink.

Flameproofing Method

Next, a flameproofing method according to an embodiment is described.

The flameproofing method includes a discharge step of discharging the ink jet composition by the ink jet process to apply the ink jet composition to a treated object.

This configuration allows the flameproofing method to be provided such that the occurrence of a problem with a large amount of liquid waste is prevented and the treated object can be efficiently flameproofed. It is not necessary that the thickness of a film containing the flameproofing agent is unnecessarily large or an unnecessarily deep portion of the treated object contains the flameproofing agent. Therefore, the reduction in handleability of a flameproof product obtained by the flameproofing method because of the reduction in flexibility thereof and/or the reduction in texture or feel due to stiffness or the like can be effectively prevented. Various treated objects can be flameproofed well in such a manner that the amount of a droplet of the ink jet composition or the amount of the ink jet composition applied to each treated object per unit area is adjusted depending on material quality, surface roughness, or the like of the treated object. When the treated object is fabric, there has been a problem in that local shrinkage occurs to reduce the flatness of the flameproof product. However, in the present disclosure, the occurrence of such a problem can be effectively prevented.

In particular, in the flameproofing method, the ink jet composition is preferably discharged by the ink jet process so as to be applied to the treated object under such conditions that the discharge velocity thereof is 5.0 m/s to 10 m/s and the shortest distance between an opening of a nozzle plate and a surface of the treated object is 0.5 mm to 5.0 mm.

This enables droplets of the ink jet composition to be evenly and stably discharged and also enables a film formed from the ink jet composition to be locally placed near a surface of the treated object. In other words, the unnecessary increase in thickness of the film of the ink jet composition or the entry of the flameproofing agent into an unnecessarily deep portion of the treated object is effectively prevented and the flameproof product can be manufactured so as to have sufficient flameproof properties.

The lower limit of the discharge velocity of the ink jet composition is preferably 5.0 m/s as described above, more preferably 5.5 m/s, and further more preferably 6.0 m/s. The upper limit of the discharge velocity of the ink jet composition is preferably 10 m/s, more preferably 9.0 m/s, and further more preferably 8.0 m/s.

This allows the above-mentioned effects to be more remarkably exhibited.

The lower limit of the shortest distance between the nozzle plate opening and the treated object surface is preferably 0.5 mm as described above, more preferably 1.0 mm, and further more preferably 1.5 mm. The upper limit of the shortest distance between the nozzle plate opening and the treated object surface is preferably 5.0 mm, more preferably 4.5 mm, and further more preferably 4.0 mm.

This allows the above-mentioned effects to be more remarkably exhibited.

The ink jet composition is preferably applied to the treated object with a droplet weight of 15 ng or less at a rate of 15 mg/inch$^2$ or more.

This enables the ink jet composition to be evenly and stably applied to the treated object. Flameproof properties and the like of the flameproof product can be more effectively exhibited. The unnecessary increase in thickness of the film of the ink jet composition or the entry of the flameproofing agent into an unnecessarily deep portion of the treated object can be effectively prevented; hence, the texture, feel, flexibility, and the like of the flameproof product can be rendered more excellent.

The weight of each droplet of the ink jet composition is preferably 15 ng or less as described above, more preferably 14 ng or less, and further more preferably 13 ng or less. The lower limit of the weight of each droplet of the ink jet composition is preferably 2 ng, more preferably 5 ng, and further more preferably 7 ng.

This allows the above-mentioned effects to be more remarkably exhibited.

The amount of the ink jet composition applied to the treated object per unit area is preferably 15 mg/inch$^2$ or more as described above, more preferably 20 mg/inch$^2$ or more, and further more preferably 25 mg/inch$^2$ or more. The upper limit of the amount of the ink jet composition applied to the treated object per unit area is preferably 70 mg/inch$^2$ and more preferably 60 mg/inch$^2$.

This allows the above-mentioned effects to be more remarkably exhibited.

In the discharge step, the ink jet composition may be discharged by the ink jet process and various ink jet devices can be used.

The flameproofing method may include a step other than the discharge step as required.

The flameproofing method may include, for example, a drying step of removing the liquid medium after the discharge step.

The lower limit of the temperature in the drying step is, but is not particularly limited to, preferably 5° C., more preferably 10° C., and further more preferably 15° C. The upper limit of the temperature in the drying step is, but is not particularly limited to, preferably 80° C., more preferably 70° C., and further more preferably 50° C.

This enables the ink jet composition applied to the treated object to be more efficiently dried and also enables the unintentional deformation of a pattern formed by the ink jet process because of, for example, the rapid evaporation, bumping, or the like of the liquid medium to be effectively prevented.

When the ink jet composition contains a crosslinking component, the flameproofing method may include a crosslinking step of allowing a crosslinking reaction to proceed.

The lower limit of the temperature in the crosslinking step is preferably 90° C., more preferably 100° C., and further more preferably 120° C. The upper limit of the temperature in the crosslinking step is preferably 250° C., more preferably 230° C., and further more preferably 200° C.

This enables the unintentional modification or deterioration of a component of the ink jet composition to be effectively prevented and also enables the crosslinking reaction to proceed efficiently.

When the ink jet composition contains a curable component, the flameproofing method may include a curing step of allowing a curing reaction to proceed.

Treated Object

Examples of the treated object, to which the ink jet composition is applied, include, but are not limited to, fabrics; resin (plastic) films; various types of paper including printing/information paper, wrapping paper, glassine, synthetic paper, paperboard, and wall paper; and combinations of two or more of these. The treated object used may be, for example, one subjected to printing in advance.

The treated object may be one including an absorbing layer absorbing the ink jet composition.

The treated object used may be, for example, one having a sheet shape or a three-dimensional shape such as a spherical shape or a cuboid shape.

When the treated object is fabric, examples of fibers making up the fabric include polyester fibers, nylon fibers, triacetate fibers, diacetate fibers, polyamide fibers, and blends of two or more of these fibers. Blends of these fibers and recycled fibers such as rayon fibers or natural fibers such as cotton fibers, silk fibers, or wool fibers may be used.

When the treated object is a resin (plastic) film, examples of the resin (plastic) film include a polyester film, a polyurethane film, a polycarbonate film, a polyphenylene sulfide film, a polyimide film, and a polyamideimide film.

The resin (plastic) film may be a laminate including a plurality of laminated layers or one made of a gradient material in which the composition of material varies gradually.

Flameproof Product

The flameproof product is one manufactured using the ink jet composition and can be manufactured by, for example, the flameproofing method.

The flameproof product has excellent flameproof properties and is excellent in durability such as rubfastness. The reduction in texture or feel of the treated object is effectively prevented.

The flameproof product preferably satisfies such conditions that, after heating for one minute and after three seconds from lighting, the afterflame time is three seconds or less, the afterglow time is five seconds or less, and the char area is 30 cm$^2$ or less as measured in accordance with the JIS L 1091 A-1 method (45° micro-burner method).

This allows the flameproof product to have more excellent flameproof properties.

After the flameproof product is water-washed under predetermined conditions, that is, after the flameproof product is treated five times in such a manner that the flameproof product is water-washed at 60° C.±2° C. for 15 minutes at a bath ratio of 1:40 using a weakly alkaline first-type detergent at a rate of 1 g/L, is rinsed at 40° C.±2° C. for five minutes three times, is centrifugally dehydrated for two minutes, and is then dried with hot air at 60° C.±5° C. in accordance with JIS K 3371, the flameproof product preferably satisfies such conditions that, after heating for one minute and after three seconds from lighting, the afterflame time is three seconds or less, the afterglow time is five seconds or less, and the char area is 30 cm² or less as measured in accordance with the JIS L 1091 A-1 method (45° micro-burner method).

This allows the flameproof product to have more excellent flameproof properties.

After the flameproof product is dry-cleaned under predetermined conditions, that is, after the flameproof product is treated at 30° C.±2° C. for 15 minutes using 12.6 mL of tetrachloroethylene and 0.265 g of charge soap (a nonionic surfactant/anionic surfactant/water weight ratio of 10/10/1) per 1 g of the flameproof product five times, the flameproof product preferably satisfies such conditions that, after heating for one minute and after three seconds from lighting, the afterflame time is three seconds or less, the afterglow time is five seconds or less, and the char area is 30 cm² or less as measured in accordance with the JIS L 1091 A-1 method (45° micro-burner method).

This allows the flameproof product to have more excellent flameproof properties.

Applications of the flameproof product are not particularly limited and may be, for example, applications, including various interiors such as stage curtains, fabric blinds, hangings, curtains, carpets, wallpaper, sliding doors, sliding screens, and veneers; sheets; blankets; various covers; hats; gloves; clothes; handkerchiefs; towels; gauze; construction sheets; and plywood, requiring flameproof properties.

Preferred embodiments of the present disclosure have been described above. The present disclosure is not limited to these embodiments.

EXAMPLES

Next, detailed examples of the present disclosure are described.
(1) Preparation of Ink Jet Composition

Example 1

First, the following materials were prepared: decabromodiphenyl ether (produced by Tokyo Chemical Industry Co., Ltd.) serving as a bromine-based flameproofing agent, resin particles made of an acrylic resin (Joncryl-PDX7677, produced by BASF Company), Hytec E-9015 (produced by Toho Chemical Industry Co., Ltd., a melting point of 137° C.) serving as a lubricant, glycerin, triethylene glycol, polypropylene glycol, triethylene glycol monobutyl ether, triethanolamine, an aqueous solution of sodium hydroxide, BYK-348 (produced by Byk Chemie Japan K.K.) serving as a silicone surfactant, and ion-exchanged water.

These were mixed at a predetermined ratio, whereby an ink jet composition with a composition shown in Table 1 was prepared.

Examples 2 to 8

Ink jet compositions were prepared in substantially the same manner as that described in Example 1 except that the types of components used to prepare the ink jet compositions and the blending ratio between the components were changed such that compositions shown in Table 1 were obtained.

Comparative Examples 1 and 2

Ink jet compositions were prepared in substantially the same manner as that described in Example 1 except that the types of components used to prepare the ink jet compositions and the blending ratio between the components were changed such that compositions shown in Table 1 were obtained.

Conditions of the ink jet compositions prepared in the examples and the comparative examples are summarized in Table 1. Incidentally, in Table 1, the term "parts" refers to parts by mass. In Table 1, "F1" represents decabromodiphenyl ether (produced by Tokyo Chemical Industry Co., Ltd.) serving as a bromine-based flameproofing agent; "F2" represents triphenyl phosphate (produced by Tokyo Chemical Industry Co., Ltd.) serving as a phosphorus-based flameproofing agent; "F3" represents chlorinated paraffin (Toyoparax, produced by Tosoh corporation) serving as a chlorine-based flameproofing agent; "R1" represents the resin particles made of the acrylic resin (Joncryl-PDX7677, produced by BASF Company, a weight-average molecular weight of 160,000); "R2" represents resin particles made of a urethanic resin (Takelac WS-4022, produced by Mitsui Chemicals, Inc.), having an ester skeleton, containing a silanol group serving as a crosslinking group; "R3" represents resin particles made of a urethanic resin (ETERNACOLL UW-1501F, produced by Ube Industries, Ltd.), having a polycarbonate skeleton, containing a blocked isocyanate group serving as a crosslinking group; "R4" represents resin particles made of a urethanic resin (Takelac WS-5984, produced by Mitsui Chemicals, Inc.), having an ester skeleton, containing a silanol group serving as a crosslinking group; "W1" represents Hytec E-9015 (produced by Toho Chemical Industry Co., Ltd., a melting point of 137° C.) serving as a lubricant; "W2" represents AQUACER 593 (produced by Byk Chemie Japan K.K., a melting point of 160° C.) serving as a lubricant; "W3" represents AQUACER 497 (produced by Byk Chemie Japan K.K., a melting point of 60° C.) serving as a lubricant; "CL1" represents EPOCROS K2010E (produced by Nippon Shokubai Co., Ltd.) serving as a crosslinking agent containing an oxazoline group; "GL" represents glycerin; "TEG" represents triethylene glycol; "PG" represents propylene glycol; "TEGBE" represents triethylene glycol monobutyl ether; and "TEA" represents triethanolamine. The ink jet compositions prepared in the examples all had a surface tension ranging from 23 mN/m to 30 mN/m. The surface tension was measured at 25° C. by the Wilhelmy method using a surface tensiometer (CBVP-7, manufactured by Kyowa Interface Science Co., Ltd.). The ink jet compositions prepared in the examples all had a viscosity ranging from 4 mPa·s to 6 mPa·s at 25° C. Incidentally, the viscosity of each ink jet composition was determined by measurement in accordance with JIS Z 8809 using a vibratory viscometer (VM-100, manufactured by SEKONIC Corporation).

TABLE 1

| | Flameproofing agent | | Resin particles | | Lubricant | | Crosslinking agent | | Liquid medium | |
|---|---|---|---|---|---|---|---|---|---|---|
| | | | | | | | | | Water | GL |
| | Type | Content (parts) | Type | Content (parts) | Type | Content (parts) | Type | Content (parts) | Content (parts) | Content (parts) |
| Example 1 | F1 | 12.0 | R1 | 10.0 | W1 | 3.0 | — | — | 66.67 | 3.0 |
| Example 2 | F1 | 12.0 | R2 | 10.0 | W1 | 3.0 | CL1 | 5.0 | 61.67 | 3.0 |
| Example 3 | F1 | 12.0 | R3 | 10.0 | W1 | 3.0 | CL1 | 5.0 | 61.67 | 3.0 |
| Example 4 | F2 | 11.0 | R3 | 10.0 | W2 | 3.0 | CL1 | 5.0 | 62.67 | 3.0 |

TABLE 1-continued

| Example 5 | F2 | 11.0 | R4 | 10.0 | W2 | 3.0 | CL1 | 5.0 | 62.67 | 3.0 |
|---|---|---|---|---|---|---|---|---|---|---|
| Example 6 | F2 | 9.0 | R4 | 10.0 | W3 | 3.0 | CL1 | 4.0 | 65.67 | 3.0 |
| Example 7 | F3 | 9.0 | R2 | 10.0 | W3 | 3.0 | CL1 | 4.0 | 65.67 | 3.0 |
| Example 8 | F1/F2 | 6.0/6.0 | R3 | 10.0 | W1 | 3.0 | CL1 | 5.0 | 61.67 | 3.0 |
| Comparative Example 1 | — | — | R2 | 10.0 | — | — | CL1 | 5.0 | 67.67 | 11.0 |
| Comparative Example 2 | F1 | 12.0 | — | — | — | — | — | — | 68.67 | 13.0 |

|  | Liquid medium | | | | Surfactant | |
|---|---|---|---|---|---|---|
|  | TEG Content (parts) | PG Content (parts) | TEGBE Content (parts) | TEA Content (parts) | NaOH Content (parts) | BYK-348 Content (parts) |
| Example 1 | 2.0 | 1.5 | 1.0 | 0.5 | 0.03 | 0.3 |
| Example 2 | 2.0 | 1.5 | 1.0 | 0.5 | 0.03 | 0.3 |
| Example 3 | 2.0 | 1.5 | 1.0 | 0.5 | 0.03 | 0.3 |
| Example 4 | 2.0 | 1.5 | 1.0 | 0.5 | 0.03 | 0.3 |
| Example 5 | 2.0 | 1.5 | 1.0 | 0.5 | 0.03 | 0.3 |
| Example 6 | 2.0 | 1.5 | 1.0 | 0.5 | 0.03 | 0.3 |
| Example 7 | 2.0 | 1.5 | 1.0 | 0.5 | 0.03 | 0.3 |
| Example 8 | 2.0 | 1.5 | 1.0 | 0.5 | 0.03 | 0.3 |
| Comparative Example 1 | 3.0 | 1.5 | 1.0 | 0.5 | 0.03 | 0.3 |
| Comparative Example 2 | 3.0 | 1.5 | 1.0 | 0.5 | 0.03 | 0.3 |

(2) Evaluation (2-1) Young's Modulus of Dry Film

First, a frame, made of silicone rubber (a thickness of 5 mm), having an opening portion with a size of 3 cm×19 cm was brought into close contact with a flat plate made of stainless steel (SUS) and 10 g of each ink jet composition was put in the opening portion and was dried at 25° C. for 12 hours in air. After the dried ink jet composition was heat-treated at 160° C. for 15 minutes and was returned to 25° C., no change in weight was confirmed and a dried film was peeled from the flat plate made of SUS, whereby the dry film for Young's modulus measurement was obtained.

The thickness of the dry film was determined by measurement with a micrometer (for example, the trade name "MDH-25M", manufactured by Mitutoyo Corporation). A specimen having a width of 10 mm and a length of 30 mm was cut out of the vicinity of the center of the dry film obtained as described above. A stress-strain curve was measured for the specimen at a strain rate of 100 mm/min using a TENSILON universal testing machine (the trade name RTG-1250, manufactured by A&D Company, Limited. The Young's modulus (MPa) was determined by linear regression between a strain of 0.05% and a strain of 0.25% in the obtained stress-strain curve.

(2-2) Feel of Flameproof Products

A flameproof product was manufactured using the ink jet composition prepared in each of the examples and the comparative examples as described below.

First, ink jet inks (a cyan ink, a magenta ink, a yellow ink, and a black ink) for SC-F2000 were discharged to a surface of a cotton fabric (11-canvas (cotton 100%), manufactured by Wakayama Senko Co., Ltd.) serving as a treated object using an ink jet device (a modification of SC-F2000, manufactured by Seiko Epson Corporation) so as to form a predetermined pattern. Thereafter, the cotton fabric was dried by heating at 170° C. for ten minutes using a conveyer drying oven (an Economax D conveyor dryer, manufactured by M&R Companies), whereby a print was obtained.

Thereafter, a portion of the print obtained as described above was used as a treated object and the ink jet composition was discharged to the surface of the print that was provided with the ink jet inks using an ink jet device (a modification of SC-F2000, manufactured by Seiko Epson Corporation) under such conditions that the discharge velocity was 6.0 m/s, the shortest distance between an opening of a nozzle plate and a surface of the treated object was 2.5 mm, the weight of each droplet was 12.0 ng, and the coating density of the ink jet composition was 39 mg/inch$^2$.

Next, the print was dried at 25° C. for 12 hours in air, was heat-treated at 160° C. for 15 minutes, and was then returned to 25° C., whereby the flameproof product was obtained.

A 20 cm square specimen was cut out of the flameproof product, which was obtained as described above. The specimen was measured under conditions including a shear tension of 10 gf/cm and a shear angle of ±8° using a tensile shear tester (the product name "KES-FB1-A") manufactured by Kato Tech Co., Ltd., whereby a tension-curvature curve was obtained. The shear hardness (gf/(cm·deg)) was determined by linear regression between a curvature of 0.5° and a curvature of 2.5° in the obtained tension-curvature curve. Hereinafter, the shear hardness is referred to as shear hardness A.

A print not treated with the ink jet composition was determined for shear hardness (gf/(cm·deg)) in the same manner as the above. Hereinafter, this shear hardness is referred to as shear hardness B.

For the examples and the comparative examples, the absolute value of the difference between the shear hardness A and the shear hardness B was determined and was evaluated in accordance with standards below. It can be said that as the absolute value of the difference between the shear hardness A and the shear hardness B is smaller, the degree of reduction in feel due to the ink jet composition is smaller.

A: The absolute value of the difference between the shear hardness A and the shear hardness B is 0.5 or less.

B: The absolute value of the difference between the shear hardness A and the shear hardness B is more than 0.5 to 1.0 or less.

C: The absolute value of the difference between the shear hardness A and the shear hardness B is more than 1.0 to 1.5 or less.

D: The absolute value of the difference between the shear hardness A and the shear hardness B is more than 1.5.

(2-3) Flameproofness of Flameproof Products

The flameproof products, manufactured in Item (2-2), according to the examples and the comparative examples were evaluated for flameproofness by a 45° micro-burner method and a 45° coil method as described below.

The flameproof products according to the examples and the comparative examples were evaluated in three states: a state immediately after manufacture, that is, a state in which none of water washing and dry cleaning was performed, a state in which water washing only was performed, and a state in which dry cleaning only was performed.

Water washing conditions were as described below. That is, each flameproof product was treated five times in such a manner that the flameproof product was water-washed at 60° C.±2° C. for 15 minutes at a bath ratio of 1:40 using a weakly alkaline first-type detergent at a rate of 1 g/L, was rinsed at 40° C.±2° C. for five minutes three times, was centrifugally dehydrated for two minutes, and was then dried with hot air at 60° C.±5° C. in accordance with JIS K 3371.

Dry cleaning conditions were as described below. That is, each flameproof product was treated at 30° C.±2° C. for 15 minutes using 12.6 mL of tetrachloroethylene and 0.265 g of charge soap (a nonionic surfactant/anionic surfactant/water weight ratio of 10/10/1) per 1 g of the flameproof product five times.

(2-3-1) Evaluation by 45° Micro-Burner Method

The flameproof products according to the examples and the comparative examples were measured for flameproofness in the above three states by the JIS L 1091 A-1 method (45° micro-burner method). In a case where a flameproof product was not lighted after heating for one minute, the afterflame time, the afterglow time, and the char area were measured after heating for one minute. In a case where a flameproof product was lighted within one minute after the start of heating, the afterflame time, the afterglow time, and the char area were measured after a flame was extinguished by removing a burner after three minutes from lighting. The flameproof products according to the examples and the comparative examples were evaluated in accordance with standards below.

A: The afterflame time is three seconds or less, the afterglow time is five seconds or less, and the char area is 30 cm² or less.

B: The afterflame time is five seconds or less, the afterglow time is 20 seconds or less, or the char area is 40 cm² or less.

C: Other than these.

(2-3-2) Evaluation by 45° Coil Method

The flameproof products according to the examples and the comparative examples were measured for flameproofness in the above three states by the JIS L 1091 D method (45° coil method) and were evaluated in accordance with standards below.

A: The number of contacts with flame is three or more.

B: The number of contacts with flame is two.

C: Other than these.

These results are summarized in Table 2.

TABLE 2

| | | | Flameproofness | | | | | |
| | | | 45° micro-burner method | | | 45° coil method | | |
| | Young's modulus (MPa) | Feel | Immediately after manufacture | After water washing | After dry cleaning | Immediately after manufacture | After water washing | After dry cleaning |
| --- | --- | --- | --- | --- | --- | --- | --- | --- |
| Example 1 | 12 | A | A | A | B | A | A | B |
| Example 2 | 57 | B | A | A | A | A | A | A |
| Example 3 | 24 | A | A | A | A | A | A | A |
| Example 4 | 28 | A | A | A | A | A | A | A |
| Example 5 | 11 | A | A | A | B | A | A | B |
| Example 6 | >9 | A | A | A | B | A | A | B |
| Example 7 | 55 | B | A | A | A | A | A | A |
| Example 8 | 25 | A | A | A | A | A | A | A |
| Comparative Example 1 | 62 | B | C | C | C | C | C | C |
| Comparative Example 2 | — | A | A | C | C | A | C | C |

As is clear from Table 2, in the flameproof products according to the examples, excellent results were obtained. However, in the flameproof products according to the comparative examples, no satisfactory results were obtained.

Furthermore, ink jet compositions were prepared in substantially the same manner as that described in the examples except that the content of a flameproofing agent in each ink jet composition was varied within the range of 3.0% by mass to 30% by mass, the content of resin particles in the ink jet composition was varied within the range of 2.0% by mass to 25% by mass, the content of a lubricant in the ink jet composition was varied within the range of 0.5% by mass to 10% by mass, the content of a crosslinking agent in the ink jet composition was varied within the range of 1.0% by mass to 10% by mass, the ratio (XF/XR) of the content (XF (mass percent)) of the flameproofing agent in the ink jet composition to the content (XR (mass percent)) of the resin particles in the ink jet composition was varied within the range of 0.5 to 2.0, and the ratio (XW/XR) of the content (XW (mass percent)) of the lubricant in the ink jet composition to the content (XR (mass percent)) of the resin particles in the ink jet composition was varied within the range of 0.05 to 0.70. The ink jet compositions were evaluated in the same manner as the above, so that results similar to the above were obtained.

Furthermore, flameproof products were manufactured in substantially the same manner as that described in the examples except that the discharge velocity of an ink jet composition was varied within the range of 5.0 m/s to 10 m/s and the shortest distance between an opening of a nozzle plate and a surface of a treated object was varied within the range of 0.5 mm to 5.0 mm. The flameproof products were evaluated in the same manner as the above, so that results similar to the above were obtained.

What is claimed is:

1. An ink jet composition containing:
   a flameproofing agent that includes at least one selected from the group consisting of a phosphorus-based flameproofing agent and a chlorine-based flameproofing agent; and
   resin particles.

2. The ink jet composition according to claim 1, wherein the resin particles are urethanic resin particles.

3. The ink jet composition according to claim 2, wherein a urethanic resin making up the urethanic resin particles is a urethanic resin containing a crosslinking group and the crosslinking group is one or more selected from the group consisting of a blocked isocyanate group and a silanol group.

4. The ink jet composition according to claim 2, wherein the urethanic resin making up the urethanic resin particles has a polycarbonate skeleton.

5. The ink jet composition according to claim 1, further containing a lubricant with a melting point of 200° C. or less.

6. The ink jet composition according to claim 1, further containing a colorant, wherein
   the content of the colorant is 0.1% by mass or less.

7. The ink jet composition according to claim 1, wherein a dry film of the ink jet composition has a Young's modulus of 5 MPa to 70 MPa.

8. A flameproofing method comprising a discharge step of discharging the ink jet composition according to claim 1 by an ink jet process to apply the ink jet composition to a treated object.

9. The flameproofing method according to claim 8, wherein, in the discharge step, the ink jet composition is discharged under such conditions that the discharge velocity thereof is 5.0 m/s to 10 m/s and the shortest distance between an opening of a nozzle plate and a surface of the treated object is 0.5 mm to 5.0 mm.

10. The flameproofing method according to claim 8, wherein, in the discharge step, the ink jet composition is applied to the treated object with a droplet weight of 15 ng or less at a rate of 15 mg/inch$^2$ or more.

* * * * *